UNITED STATES PATENT OFFICE.

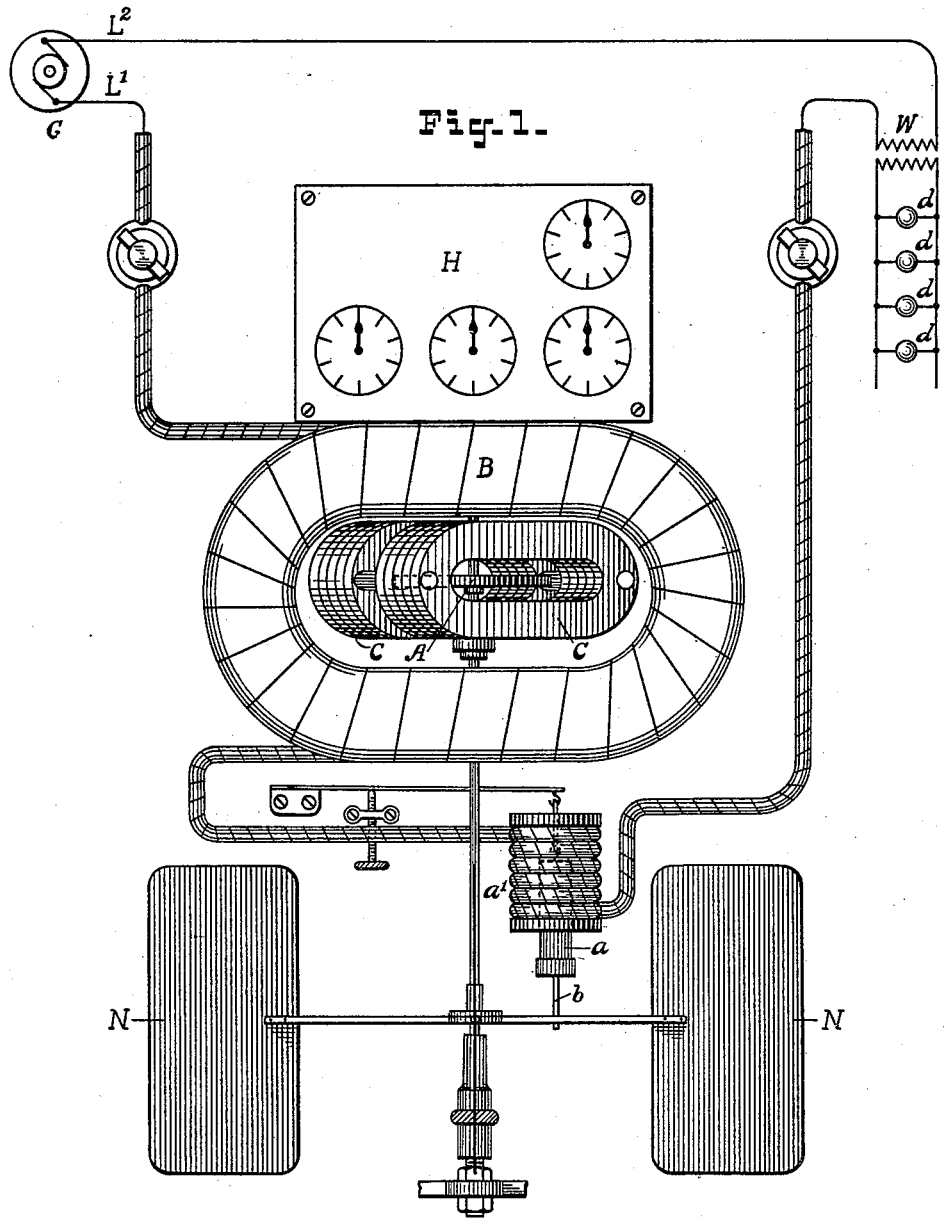

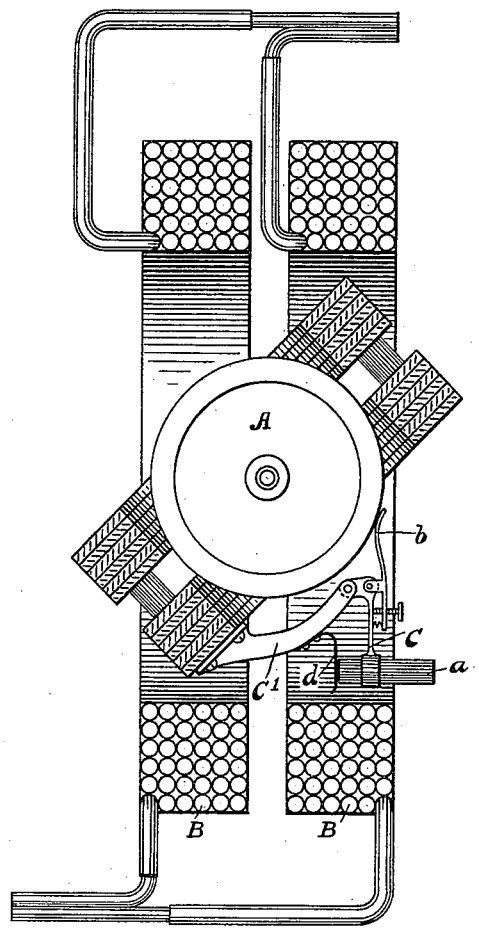

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

METER FOR ALTERNATING ELECTRIC CURRENTS.

SPECIFICATION forming part of Letters Patent No. 449,003, dated March 24, 1891.

Application filed March 13, 1890. Serial No. 343,706. (No model.)

*To all whom it may concern:*

Be it known that I, OLIVER B. SHALLENBERGER, a citizen of the United States, and a resident of Rochester, in the county of Beaver and State of Pennsylvania, have invented a certain new and useful Improvement in Meters for Alternating Electric Currents, (Case No. 392,) of which the following is a specification.

My invention relates to certain improvements in apparatus for measuring electric currents consumed in doing useful work upon alternating-current circuits.

The object of the invention is to provide means whereby a meter may be caused to register only the current consumed in doing useful work and preventing it from being operated by the leakage currents, which may flow in the circuit or by such currents as may be consumed in any other operation than doing useful work. Such a measuring-instrument is especially desirable in connection with the primary circuits supplying electric converters or transformers, for the reason that there is practically more or less leakage through the primary coils of the converters even when no work is being done in their secondary circuits, and, therefore, unless special means are employed to guard against it a meter placed in the primary circuit would record the flow of such currents and might be continually operated even though no useful work were being done. Again, the meter placed in any circuit may be subjected to a continual flow of current owing to a more or less defective insulation or from some other cause.

My invention consists in so organizing a meter designed to be connected in an electric circuit that it will commence to operate only when the flow of current through the circuit to which it is applied exceeds the leakage of the circuit or of converters which may be connected in the circuit, and at the same time will give an accurate record of the current consumed in doing useful work.

In the accompanying drawings, Figure 1 represents one form of apparatus for carrying the invention into practice, and Fig. 2 a modification.

Referring to the figures, G represents a suitable source of alternating, intermittent, or pulsatory electric currents, and $L'$ $L^2$ conductors leading therefrom to a work-circuit W. This work-circuit is represented as having a converter connected in it by its primary coil. The secondary coil is represented as supplying translating devices $d$, which may be incandescent electric lamps or other apparatus, which may be cut into and out of circuit, as desired. The meter is represented as of the general character described in certain Letters Patent issued to me August 14, 1888, Nos. 388,003 and 388,004. The invention is applicable to other forms of meters; but it will be particularly described in connection with the form therein set forth.

The meter is constructed with a primary coil B, connected in the conductor $L'$, the secondary coil C, placed at an angle to the primary coil, and an armature A, acted upon by the resultant effects of the two coils in the manner described in the patents referred to. The revolutions of the armature are recorded upon a suitable train or counting mechanism, as indicated at H, and the rate of revolution is made proportional through variations of current flowing by means of fans N. So long as only the leakage currents are flowing and no useful work is being done the revolution of the armature is prevented by means of a stop or detent, (shown at $b$,) which consists in this instance merely of an arm intercepting the path of the fans N. It is shown as carried upon the movable end of a solenoid $a'$, which is connected in series with the coil B. As the current through the coils B and B. the solenoid increases the core is drawn farther into the solenoid, and thus the stop is withdrawn from the path of the fans or some other moving part of the meter when the currents attain the proper value. This construction does not necessitate any initial leakage on the part of the meter itself. Other methods of applying the stop will be evident.

One form is illustrated in Fig. 2, wherein the solenoid $a'$ is dispensed with and the core $a$ is acted upon by the coil B, being placed axially with reference thereto and extending a slight distance within the coil. The core in this instance is mounted upon a lever C, carried upon the support C' and carrying a brake b, which may be slightly yielding, if desired. A delicate spring d normally presses the brake b against the armature A, and the current, which must flow through the coil B in order to draw the core a a sufficient distance into the solenoid to release the armature from the brake b, is made to equal the normal leakage current of the circuit to which the meter is applied. The core a is preferably laminated or constructed of fine iron wire, the strands of which may be separated by a varnish or other electrical insulating material, if desired.

In another application filed by me December 26, 1888, Serial No. 294,568, certain of the apparatus here described is also shown, and the general method of operation is there claimed.

I claim as my invention and desire to secure by these letters—

1. The combination, with an alternating-current electric meter having an electric motor for actuating it, of an arresting device for normally preventing the operation of the electric motor, and a releasing device for operating said arresting device and brought into action by the currents traversing the motor when they exceed a predetermined value.

2. The combination, with an electric meter having an actuating electric motor with a rotating armature, of an arresting device for preventing the tendency of the armature to rotate under the influence of currents of less than a given value, and a releasing device for said arresting device brought into action by the currents exceeding such value.

3. The combination, with an electric meter having an actuating electric motor with a rotating armature, of a device for preventing the rotation of the armature under the influence of currents of less than a predetermined value, and a core or armature acted upon by currents exceeding that value to release the meter, substantially as described.

4. In an electric meter, the combination, with the armature A, its including coils B and C, and the projection or brake b, normally pressing against the surface of the armature, of the core a, acted upon by the currents flowing to the meter and brought into operation by currents of a predetermined value to release the armature from the detent b.

In testimony whereof I have hereunto subscribed my name this 28th day of February, A. D. 1890.

OLIVER B. SHALLENBERGER.

Witnesses:
S. R. RASEMAND,
J. W. SMITH.